(12) United States Patent
Ruedel et al.

(10) Patent No.: US 6,256,156 B1
(45) Date of Patent: Jul. 3, 2001

(54) CONVERGENCE TUBE

(75) Inventors: Reinhard Ruedel, Dorndorf-Steudnitz; Ingo Koschmieder, Jena; Ergon Luther, Cospeda; Lothar Mueller, Ottendorf, all of (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/563,049

(22) Filed: May 1, 2000

(30) Foreign Application Priority Data

May 7, 1999 (DE) ............................................. 199 21 227

(51) Int. Cl.$^7$ ............................... G02B 5/04; G02B 23/00
(52) U.S. Cl. ......................... 359/836; 359/407; 359/431; 359/835
(58) Field of Search ..................................... 359/362–363, 359/368, 376–378, 399–419, 434, 834–837

(56) References Cited

U.S. PATENT DOCUMENTS

| | | | |
|---|---|---|---|
| 1,637,563 | * 8/1927 | Gary | 359/376 |
| 1,795,782 | * 3/1931 | Konig | 359/835 |
| 2,087,329 | * 7/1937 | Ott | 359/376 |
| 3,051,046 | * 8/1962 | Thompson | 359/431 |
| 4,601,550 | * 7/1986 | Yoshino et al. | 359/834 |
| 5,072,313 | * 12/1991 | Schweitzer et al. | 359/836 |

* cited by examiner

Primary Examiner—Thong Nguyen
(74) Attorney, Agent, or Firm—Reed Smith LLP

(57) ABSTRACT

A convergence tube for stereomicroscopes in which both observation beam paths are inclined relative to one another at an angle of convergence $\alpha$ and image inversion elements are provided in both observation beam paths. Four planar reflectors $R_1$ to $R_4$ are provided in each of the two beam paths and are arranged relative to one another in such a way that the axis beams incident on and emergent from the reflectors $R_1$, $R_2$ lie in a common plane $E_{1,2}$, the axis beams incident on and emergent from the reflector $R_3$ describe a plane $E_3$ that forms an angle $\beta = 90° + \alpha/4$ with the plane $E_{1,2}$, and the axis beams incident on and emergent from the reflector $R_4$ describe a plane $E_4$ that forms an angle $\beta_2 = \alpha/2$ with plane $E_3$.

9 Claims, 3 Drawing Sheets

CONVERGENCE TUBE

BACKGROUND OF THE INVENTION a) Field of the Invention

The invention is directed to a convergence tube for stereomicroscopes, in which the two observation beam paths are inclined relative to one another at a convergence angle $\alpha$ and image inversion elements are provided in both observation beam paths.

b) Description of the Related Art

Stereomicroscopes essentially comprise an objective, a tube system with image inversion elements, and oculars. Usually, there is a Galilean telescope system with a fixed or a variable (zoom) magnification arranged between the objective and the tube system. The distance between the two optical axes of the tube objectives is the stereo base.

Two characteristic types of tube have been developed: first, the parallel tube in which both optical axes emerge parallel to each other; second, the convergence tube in which the optical axes are presented to the observer at an inclination relative to each other of a convergence angle $\alpha$. The convergence angle $\alpha$ corresponds to the viewing direction of the eyes accommodated to an object at a distance of about 250 mm, and usually has a value of between 14° and 16°.

While the ergonomic design of the convergence tube has proven itself based on its advantages for the observer, it is more complicated in terms of optics and also, therefore, in technical respects relating to manufacture compared to the parallel tubes, since the convergence of the observation beam paths demands that the image inversion elements be specially designed and positioned relative to one another in a special way.

The convergence of the observation beam paths is essentially achieved according to two basic principles. In the first one, the convergence tubes are outfitted with the conventional image-erecting Porro prisms which are preceded by optical wedges, e.g., achromatic wedges.

In the second principle, the convergence tubes are provided with modified Porro prisms. For example, a 90-degree or right-angle prism is arranged in each beam path, followed by at least one prism deviating from 90°. In this connection, as a rule, the 90-degree angle is deviated from by half the convergence angle $\alpha$.

These two basic principles form the basis for design variants in which some or all of the prisms are replaced by mirrors.

The insertion of optical wedges as well as the manufacturing of prisms or mirror subassemblies with a deflection angle deviating from 90° is uneconomical with regard to manufacturing techniques.

OBJECT AND SUMMARY OF THE INVENTION

On this premise, it is the primary object of the invention to develop further a convergence tube of the type mentioned in the beginning in such a way that manufacture is simplified while a high image quality is maintained.

According to the invention, four planar reflectors $R_1$ to $R_4$ are provided in each of the two beam paths of a convergence tube of the type mentioned above and, for purposes of image inversion as well as achieving the convergence angle $\alpha$, are arranged relative to one another in such a way that the axis beams incident on and emergent from the reflectors $R_1$ and $R_2$ are on a common plane $E_{1,2}$, the axis beams incident on and emergent from reflector $R_3$ describe a plane $E_3$ that forms an angle $\beta_1 = 90° + \alpha/4$ with the plane $E_{1,2}$, wherein the axis beams emergent from $R_2$ and incident on $R_3$ lie on the lines of intersection of planes $E_{1,2}$ and $E_3$, and the axis beams incident on and emergent from the reflector $R_4$ describe a plane $E_4$ that forms an angle $\beta_2 = \alpha/2$ with the plane $E_3$, wherein the axis beams emergent from $R_3$ and incident on $R_4$ lie on the lines of intersection of planes $E_3$ and $E_4$.

This results in a relatively simple construction which has only a few optical functional elements and by which image inversion as well as the intended convergence of both observation beam paths is achieved.

In a preferred arrangement of the invention, the reflectors $R_1$ and $R_4$ are formed at right-angle prisms. In an especially preferred arrangement of the invention, the reflectors $R_1$ and $R_2$ are formed by the two short faces of a first prism $P_1$ and reflectors $R_3$ and $R_4$ are formed by the hypotenuse faces of two further prisms $P_2$ and $P_3$.

According to the invention, these three prisms are positioned in the beam path in such a way that the beam path coming from a tube objective first enters the first prism $P_1$ through the hypotenuse face and is then deflected by 90° at each of its short faces, exits through the hypotenuse face and enters the second prism $P_2$ through a first short face, and, after having been reflected at the hypotenuse face of the second prism $P_2$, exits through the second short face and then, through a first short face, enters the third prism $P_3$ where it is reflected by the hypotenuse face and reaches the ocular by way of the second short face of the third prism $P_3$.

The essential advantage of this design consists in that six right-angle prisms of identical construction can be used; this reduces expenditure on this type of convergence tube insofar as, first of all, right-angle prisms are relatively easy to manufacture from a technological point of view on the one hand and, on the other hand, because of the plurality of constructionally identical prisms, automated or rationalized production methods can also be applied, especially for series production of convergence tubes.

The orientation in the beam path in accordance with given angles of inclination $\beta_1$ and $\beta_2$ can advisably be carried out in that the three prisms $P_1$, $P_2$, $P_3$ are fitted into a mounting which is fabricated to measure and has inclined stop faces for the prisms, and the prisms can be fixed at this inclination relative to one another in the mounting.

In further advisable arrangements of the invention, the prisms can also be cemented to one another between the entrance and exit faces of the beam path.

The insertion of diaphragms at the interfaces or transitions between the prisms for the purpose of limiting scattered radiation is also conceivable.

Further, the convergence tube according to the invention can be advantageously combined with a swiveling device for changing the distance between the oculars and/or with a swiveling device for changing the observation angle. The design of such swiveling devices is known per se from prior art and need not be discussed in more detail herein. However, it should be pointed out that the swiveling for changing the distance between the oculars should be carried out by rotation around the optical axes of the two tube objectives.

In this context, it is advisable to arrange the three prisms $P_1$, $P_2$, $P_3$ in the two beam paths relative to the tube objective in such a way that the optical axis of the tube objective already lies in plane $E_{1,2}$ and is directed directly to the hypotenuse face of the first prism $P_1$.

The sequence of numbers given in the reference numbers of the reflectors $R_1$ to $R_4$ can correspond to their positioning in the beam path proceeding from the tube objective. But, of course, it lies within the framework of the invention to arrange the reflectors $R_1$ to $R_4$ or the prisms $P_1$ to $P_3$ in reverse order, in which case the light coming from the tube objective first enters the third prism $P_3$ through a first short face, where it is reflected on the hypotenuse face, reaches the hypotenuse face of the second prism $P_2$, where it is again reflected, and is then directed successively onto the two short faces of the first prism $P_1$ and then emerges from the latter to reach the ocular. However, the positioning of the three prisms $P_1$, $P_2$, $P_3$ relative to one another with respect to angles $\beta_1$ and $\beta_2$ must remain unchanged.

The invention will be described more fully in the following with reference to an embodiment example.

DESCRIPTION OF THE PREFERRED EMBODIMENTS

Figure 1:
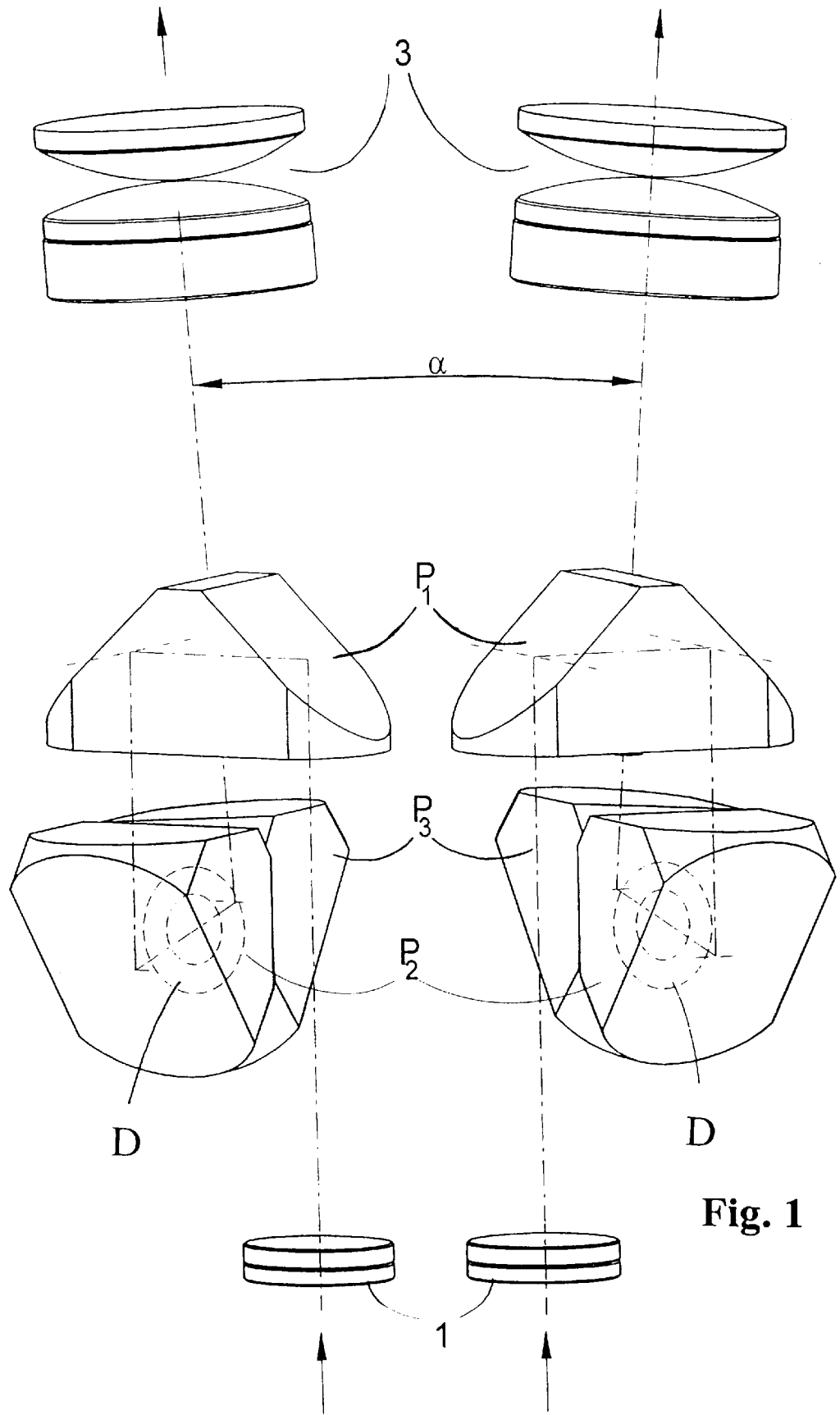
FIG. 1 shows the overall design of the convergence tube according to the invention with right-angle prisms.

FIG. 1 shows the principal beam paths in a convergence tube. The stereo base is formed by the distance between the two optical axes of the tube objectives 1. Both observation beam paths represented by their axis beams 2 extend in a mirror-symmetric manner relative to one another and each is directed from a tube objective 1 via image inversion elements to an ocular 3.

Since the number of optical subassemblies in the two observation beam paths and the course of the beam are identical, the same reference numbers will be used for both beam paths in the following description for reasons of clarity.

As can be seen in FIG. 1, three right-angle prisms $P_1$, $P_2$ and $P_3$ are arranged in each of the two beam paths. The prisms $P_1$, $P_2$ and $P_3$ are identical with regard to their optical parameters as well as their dimensioning, so that there are six identically constructed prisms in the convergence tube. There may also be included a diaphram for limiting scattered radiation which is inserted in the beam path between prisms P1 and P2 as shown.

The prisms $P_1$, $P_2$ and $P_3$ are arranged relative to one another in a mounting (m) in such a way that image inversion is carried out in a known manner and the image of the specimen to be examined by microscope appears upright in the ocular.

To achieve a convergence angle $\alpha$ without additional optical subassemblies, apart from the image inverter, it is provided according to the invention that the prisms $P_1$, $P_2$ and $P_3$ are positioned relative to one another in the manner to be shown subsequently with reference to FIG. 2.

Figure 2:
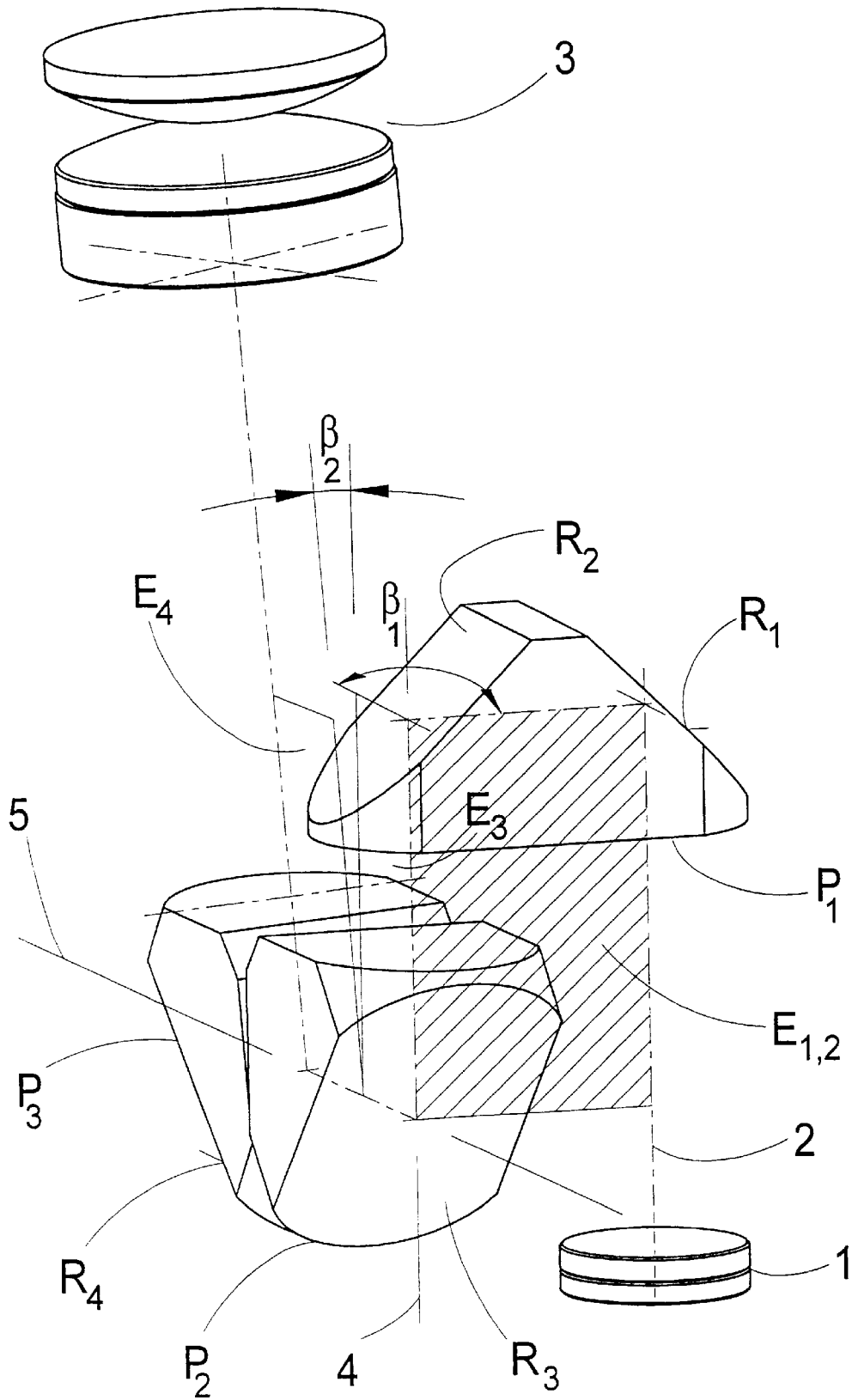
FIG. 2 shows the design using an individual beam path.

For this purpose, one of the two observation beam paths is shown in FIG. 2 from a perspective which illustrates particularly clearly the positioning of the prisms $P_1$, $P_2$, $P_3$ and their orientation relative to one another. It can be seen that the axis beam 2, after passing through the tube objective 1, strikes a planar reflector $R_1$, namely, the first short face of the prism $P_1$, where it is deflected by 90° in the direction of a reflector $R_2$, namely, the second short face of the same prism $P_1$, where the axis beam 2 is deflected again by 90° and emerges from prism $P_1$.

The axis beam 2 entering into and emerging from prism $P_1$ describes a plane $E_{1,2}$ that is characteristic for the orientation of the prism $P_1$ relative to the two other prisms $P_2$, $P_3$. The plane $E_{1,2}$ is marked by hatching.

The axis beam 2 emerging from prism $P_1$ enters the prism $P_2$ through a first short face, is deflected by 90° at its hypotenuse face (the reflector $R_3$) and emerges from the prism $P_2$ through the second short face. The axis beam 2 entering into and emerging from the prism $P_2$ describes a plane $E_3$ that is characteristic for the orientation of the prism $P_2$ relative to the two other prisms $P_1$, $P_3$.

According to the invention, the planes $E_{1,2}$ and $E_3$ are oriented relative to one another in such a way that together they form an angle $\beta_1=90°+\alpha/4$, the axis beam 2 lying on the lines of intersection 4 of the two planes $E_{1,2}$ and $E_3$.

Further, the axis beam 2 enters the prism $P_3$, is deflected by 90° at its hypotenuse face (the reflector $R_4$) and from there is directed to the ocular 3. The axis beam 2 entering the prism $P_3$ and emerging from this prism $P_3$ describes a plane $E_4$ that is characteristic for the orientation of the prism $P_3$ relative to the two other prisms $P_1$, $P_2$. According to the invention, the planes $E_3$ and $E_4$ are inclined relative to one another at an angle $\beta_2=\alpha/2$ and have a common line of intersection 5 along which the axis beam 2 runs on its way from the hypotenuse face of prism $P_2$ to the hypotenuse face of prism $P_3$.

Not only is an image inversion accomplished with this arrangement according to the invention by means of the three prisms $P_1$, $P_2$ and $P_3$, but also the observation beam paths are inclined relative to one another by the convergence angle $\alpha$, as can be seen in FIG. 1.

Figure 3:
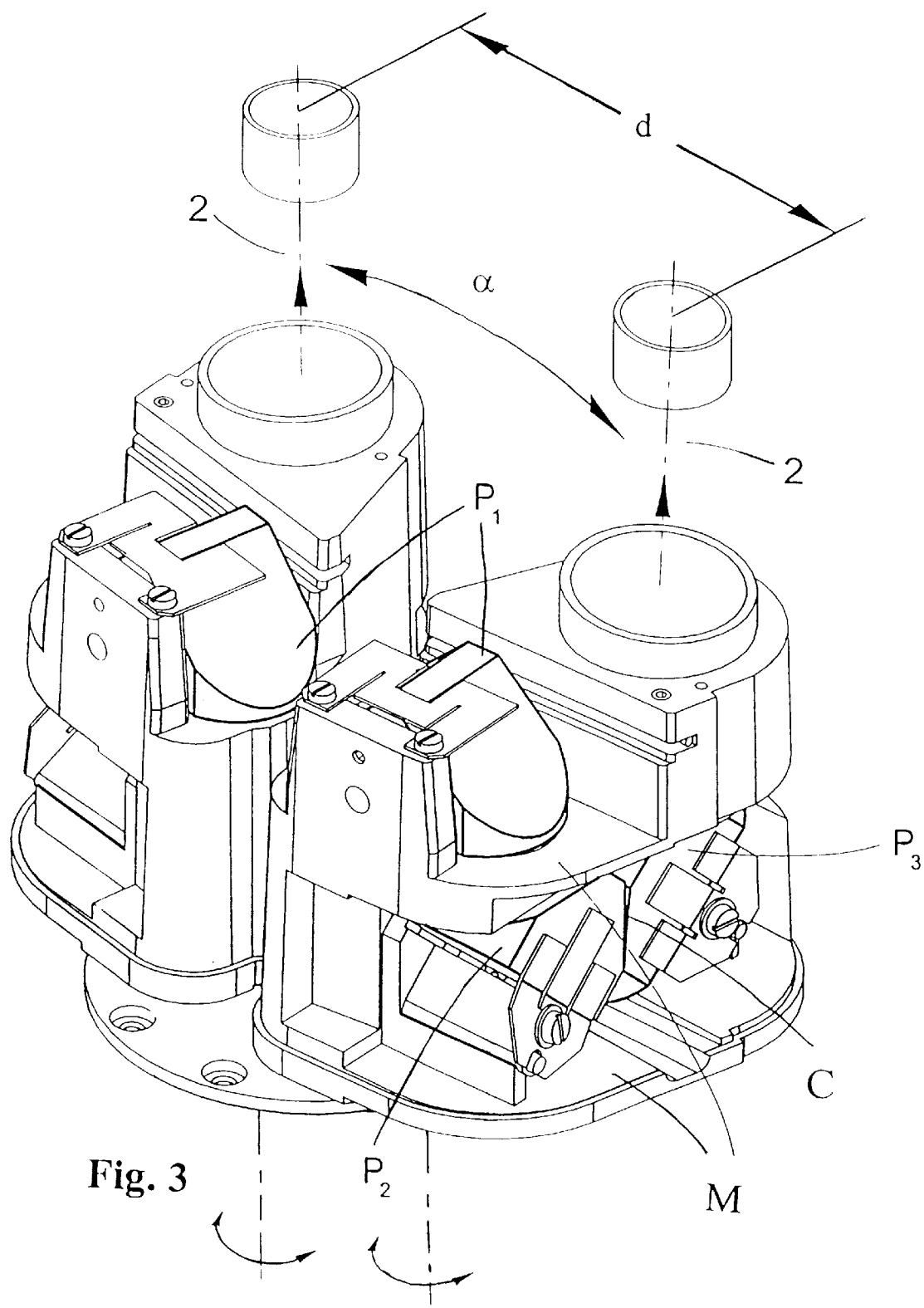
FIG. 3 shows the overall design of the convergence tube in a swiveling device for changing the distance between the oculars.

The convergence angle can have a value of a $\alpha=16°$, for example, in which case angles $\beta_1$ and $\beta_2$ take on values of 94° and 8°, respectively, corresponding to the above-indicated relationships. The converge tube may include a swiveling device for changing a distance (d) between a set of oculars 3 and/or swiveling device for changing a viewing angle. As shown in FIG. 3, Prisms P2 and P3 may be cemented (C) together.

As has been described above, it is accordingly possible to construct a convergence tube which is made of few and identical component parts and which in this respect is also economical.

While the foregoing description and drawings represent the preferred embodiments of the present invention, it will be obvious to those skilled in the art that various changes and modifications may be made therein without departing from the true spirit and scope of the present invention.

| Reference Numbers | |
|---|---|
| 1 | tube objective |
| 2 | axis beam |
| 3 | oculars |
| 4, 5 | lines of intersection |
| $R_1$, $R_2$, $R_3$, $R_4$ | planar reflectors |
| $E_{1,2}$, $E_3$, $E_4$ | planes |
| $P_1$, $P_2$, $P_3$ | prisms |
| $\alpha$, $\beta_1$, $\beta_2$ | angles |

What is claimed is:

1. A convergence tube for stereomicroscopes, in which two observation beam paths are inclined relative to one another at a convergence angle ($\alpha$) and image inversion elements are provided in said two observation beam paths, comprising:

a first, second, third and fourth reflectors ($R_1$ to $R_4$) being provided in each of said two beam paths and being arranged relative to one another in such a way that each reflectors ($R_1$ to $R_4$) deflects the beam path by 90°;

axis beams incident on and emergent from said first and said second reflectors ($R_1$ and $R_2$) lying in a common plane $E_{1,2}$;

said axis beams incident on and emergent from said third reflector ($R_3$) describing a plane $E_3$ that, together with the plane $E_{1,2}$, forms an angle $\beta_1=90°+\alpha/4$;

said axis beams emergent from said second reflector $R_2$ and incident on said third reflector $R_3$ lying on the line of intersection of the planes $E_{1,2}$ and $E_3$; and said axis beams incident on and emergent from said fourth reflector $R_4$ describing a plane $E_4$ that, together with the plane $E_3$, forms an angle $\beta_2=\alpha/2$; and said axis beams emergent from said third reflector $R_3$ and incident on said fourth reflector $R_4$ lying on the line of intersection of planes $E_3$ and $E_4$.

2. The convergence tube according to claim 1, wherein said first, second, third, and fourth reflectors ($R_1$ to $R_4$) are realized on first, second, and third right-angle prisms ($P_1$, $P_2$, $P_3$) each with a hypotenuse face.

3. The convergence tube according to claim 2, wherein beam path enters said first prism $P_1$ through the hypotenuse face, is deflected by 90° at each of two short sides of said first prism $P_1$, and emerges again through the hypotenuse face, then enters said second prism $P_2$ through a first short face and, after reflection on the hypotenuse face of said second prism $P_2$, emerges through its second short face and then enters said third prism $P_3$ through a first short face and, after reflection on the hypotenuse face of said third prism $P_3$, emerges through its second short face and is directed to the ocular.

4. The convergence tube according to claim 3, wherein a mounting (M) is provided for receiving and for holding said first said second, and said third right angle prisms ($P_1$, $P_2$, $P_3$,) which mounting has contact faces inclined relative to one another at angles $\beta_1$ and $\beta_2$ for said first, said second, and said third right angle prisms ($P_1$, $P_2$, $P_3$).

5. The convergence tube according to claim 2, wherein diaphragm (D) for limiting scattered radiation have been inserted in the beam path between said first and said second prisms ($P_1$, $P_2$).

6. The convergence tube according to claim 2, wherein the said second and said third prisms ($P_2$, $P_3$) are cemented to one another.

7. The convergence tube according to claim 1, wherein the angle of convergence ($\alpha$) has a value of about 14° to 16°.

8. The convergence tube according to claim 1, wherein a swiveling device for changing a distance (d) between a set of oculars or a swiveling device for changing a viewing angle are provided.

9. The convergence tube according to claim 1, wherein a swiveling device for changing the distance between a set of oculars and a swiveling device for changing a viewing angle are provided.

* * * * *